C. H. MARTIN.
TRACTOR.
APPLICATION FILED FEB. 18, 1918.
1,320,562.
Patented Nov. 4, 1919.
2 SHEETS—SHEET 1.
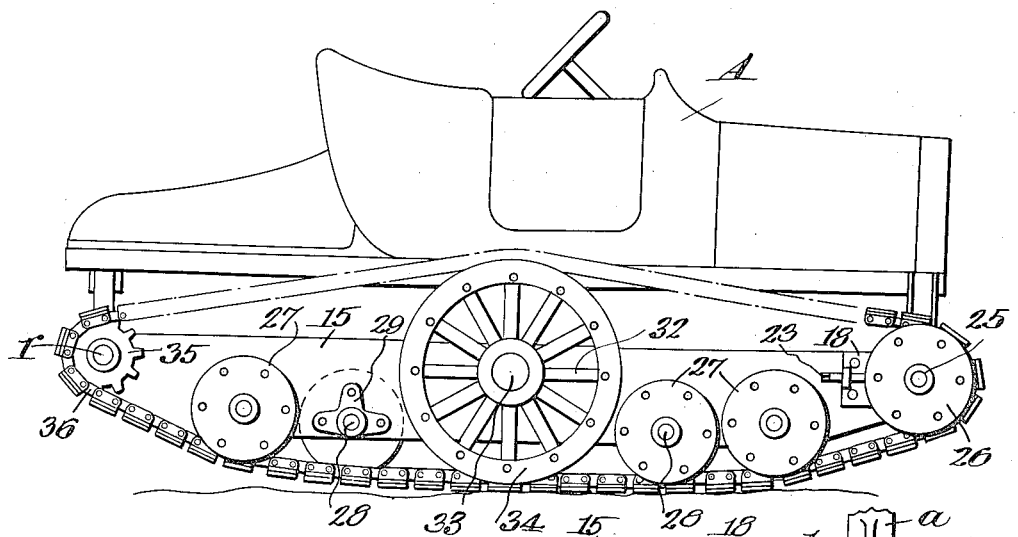
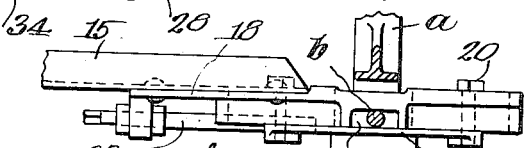
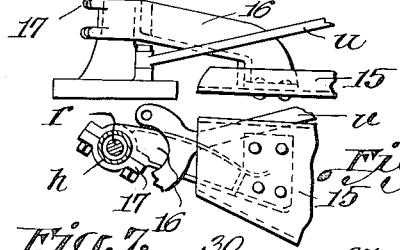
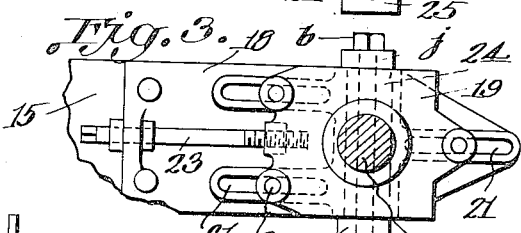
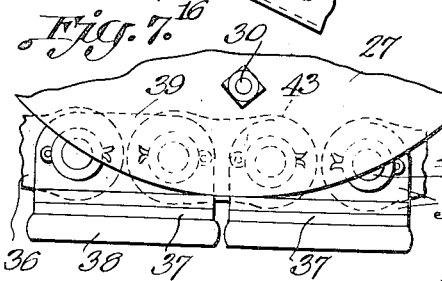
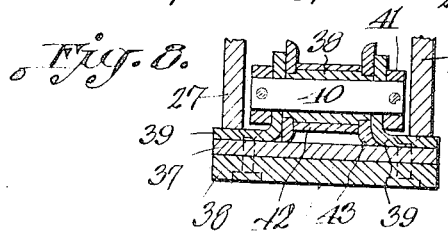
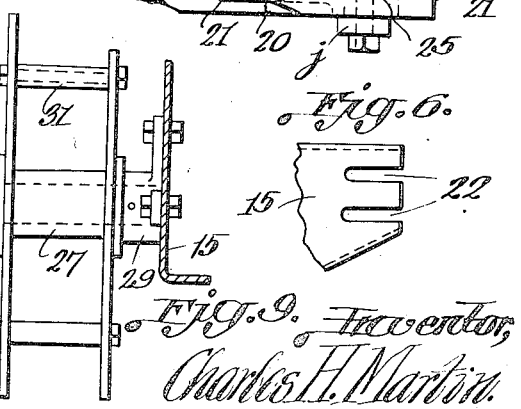

C. H. MARTIN.
TRACTOR.
APPLICATION FILED FEB. 18, 1918.
1,320,562.
Patented Nov. 4, 1919.
2 SHEETS—SHEET 2.
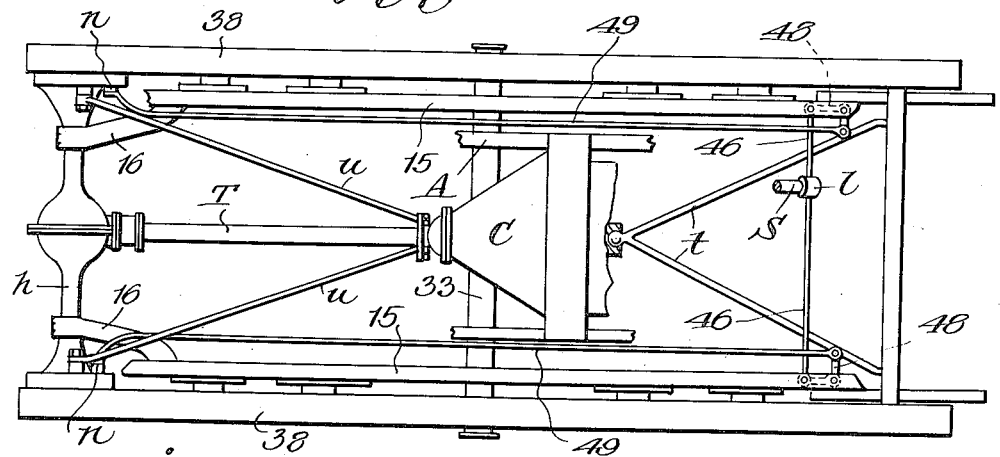
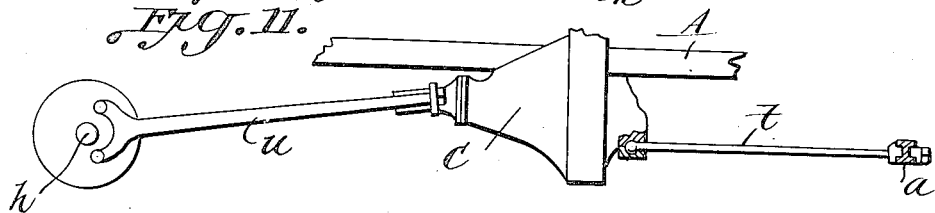
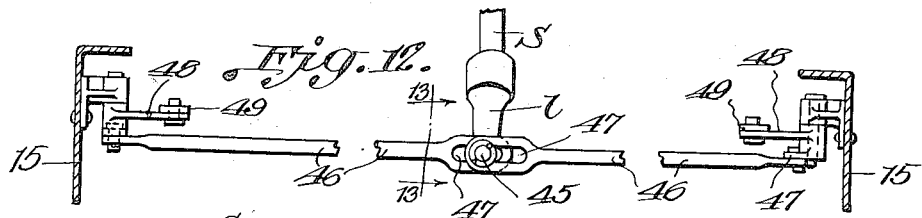
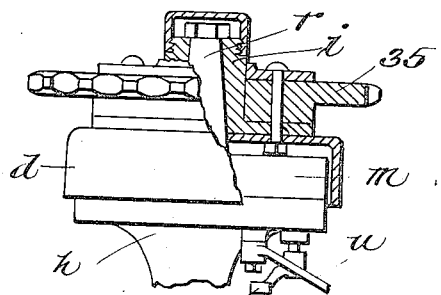
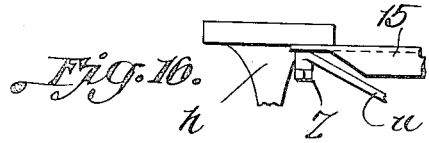
Inventor,
Charles H. Martin.
by Chapin & Neal
Attys.

UNITED STATES PATENT OFFICE.

CHARLES H. MARTIN, OF SPRINGFIELD, MASSACHUSETTS.

TRACTOR.

1,320,562.

Specification of Letters Patent.   Patented Nov. 4, 1919.

Application filed February 18, 1918.   Serial No. 217,944.

*To all whom it may concern:*

Be it known that I, CHARLES H. MARTIN, a citizen of the United States, and a resident of Springfield, in the county of Hampden and State of Massachusetts, have invented certain new and useful Improvements in Tractors, of which the following is a specification.

This invention relates to tractors and more particularly to traction units of the endless track type, by means of which an automobile may be rendered suitable for extended fields of service, as for travel on soft, sandy, and yielding soils, on rough and more or less obstructed roads, and in other localities which may be generally impassable or unsafe for ordinary vehicles.

The invention contemplates the use of the known endless self-laying traction track, which has been heretofore employed in tractors. To a certain extent, the invention is concerned generally with improvements in tractors of the endless self-laying track type, but, in the main, it relates rather to attachments which may be substituted for certain parts of existing automobiles to render them suitable for fields of service other than those for which they were originally intended. The invention is, therefore, to be distinguished in that it provides improved means for converting now existing vehicles, such as pleasure cars, out of date models of automobiles, motor trucks, and the like, into vehicles of the endless track type rather than to the original construction of such last-named vehicles. The field of the invention, then, is largely in the provision of means, which are particularly designed for, and are capable of convenient attachment to, ordinary types of automobiles and motor trucks to render them capable of service such as they originally were incapable of performing.

According to one feature of the invention, frame members are provided to connect each end of the front axle of an automobile to the transversely-located rear supporting member of the automobile, as the rear axle housing or its equivalent for the supporting function, such frames being designed for convenient attachment to the automobile after its front and rear wheels have been removed. Upon each frame member is provided an endless track with suitable supporting and guiding devices, and driving means are provided to connect the power plant of the automobile with the track, together with means to vary the speed of one track relatively to the other for the purpose of steering the vehicle.

According to another feature of the invention, a tractor is provided with laterally-spaced and suitable-driven endless tracks, which extend substantially the entire length of the vehicle and constitute the sole means for engagement with the ground, and the guiding and supporting devices for such tracks are so arranged that the lower lap of the tracks travels in a curve, any point of which may be tangential with the ground, together with means to steer the tractor by varying the speed of the tracks, characterized in that the curved lower laps of the tracks, by their restricted engagement with the ground adjacent the tangential portions, provide pivotal areas to permit easy turning of the tractor.

According to a further feature of the invention, frames supporting endless traction track mechanism are provided, and each frame is designed for attachment at one end to the rear axle housing of an existing automobile and at the other end to the forked end of the front axle after the front wheels and their spindles have been removed, and driving sprockets for the track are provided which sprockets are adapted for attachment to the rear axles of the automobile after the rear driving wheels have been removed, characterized in that an endless traction track may be provided for existing automobiles by the substitutions defined and without substantial change in such automobiles.

According to another feature of the invention, the side frame members, which support the endless traction tracks, are so connected to the axles of the automobile as to permit such movements of the axles toward and away from one another, as usually occur from movements of the spring-supported frame of the automobile and the radius rods which connect the frame and axles.

According to another feature of the invention, means are provided to connect with the usual rear axle brakes of the automobile and to operate each brake independently of the other so that the speed of either of the traction tracks, which are driven from the rear axles, may be retarded, as desired, to steer the automobile.

According to a further feature of the invention, an improved endless traction track drive is provided which includes an endless drive chain constructed to resist tensional strains and carrying track-forming units constructed to resist compressive strains, and wheels to ride on the track units without exerting compressive strains on the supporting chain.

Other features and advantages will appear in the following description and in the illustrative embodiment of the invention in the accompanying drawings, in which:

Figure 1 is a side elevational view of the traction track attachment as applied to an existing automobile;

Figs. 2 and 3 are plan and elevational views, respectively, of the forward end of one of the side frame members;

Figs. 4 and 5 are plan and elevational views, respectively of the rear end of one of the side frame members;

Fig. 6 is a detail elevational view of the forward end of one of the side frame members with the brackets, shown in Fig. 3, removed;

Figs. 7 and 8 are elevational and cross-sectional views showing portions of the endless track and a wheel which rides thereon;

Fig. 9 is an end elevational view of one of the wheels for the endless track and illustrates the mounting of such wheel on its side frame member;

Fig. 10 is a diagrammatical plan view showing the traction units connected to the front axle and rear axle housing of an automobile and particularly illustrates the steering mechanism;

Fig. 11 is a fragmentary and somewhat diagrammatical view of a part of Fig. 10;

Fig. 12 is an enlarged front elevational view of Fig. 10 showing the means for connecting the steering column to the operating mechanism for the rear axle brakes;

Fig. 13 is a cross-sectional view taken on the line 13—13 of Fig. 12;

Fig. 14 is a fragmentary rear elevational view of the endless track driving member and parts associated therewith; and Figs. 15 and 16 are elevational and plan views, respectively, showing a modification.

Referring to these drawings and particularly to Figs. 1 to 8, inclusive, 15 represents a suitable side frame to support an endless track and its guiding devices. Such frame may be advantageously made up from steel plate pressed into channel-shaped cross-section, as illustrated. As shown in Fig. 10, two of the frames 15 are employed and each is adapted to extend longitudinally of the automobile A and between the front and rear axles thereof. At one end each frame 15 has an inwardly offset arm 16 (Figs. 4 and 5) which, in the illustrated embodiment of the invention, is designed to fit over and partially encompass a part of the rear axle housing $h$ of the automobile and preferably is held thereto by a plate 17 and suitable bolts, as shown, to permit a slight degree of oscillation of the housing $h$, for a reason later to appear. In the event that the particular automobile with which the traction unit is employed is of the known type embodying live and dead rear axles, the frames 15 may be similarly secured to the dead axle or to any other transversely-located members which are equivalent to the rear axle housing in so far as its function in supporting the automobile is concerned. It is to be particularly noted that arms 16 are so offset inwardly and are so bent as to permit attachment of the frames 15 without disturbing or interfering with the usual radius rods of the rear axle housing $h$, which rods are indicated at $u$ in Figs. 4 and 5.

If desired, the frame members 15 may be attached directly to the rear axle housing $h$. For example, the construction shown in Figs. 15 and 16 may be employed. Each frame 15 has its rear end secured between the usual rear radius rods $u$ and the flanged end of the rear axle housing by the bolts $z$ which formerly clamped the radius rods to such flanged end of the housing. It is preferred to permit restricted oscillatory movements of the housing $h$ relatively to frame 15, and accordingly the lower bolt $z$ passes through a curved slot 15′ in the frame member, the center of curvature of slot 15′ being the upper bolt $z$. Thus, the housing may oscillate on the frames 15 to a limited extent, which arrangement is desirable for reasons to be later described.

At the other and forward end of each frame 15, there is rigidly secured to its outer face, as by riveting, a member 18 which projects forwardly beyond the frame, as shown in Figs. 2 and 3. The member 18 is adapted to closely fit between the upper and lower jaws $j$ of the forked end of the front axle $a$ of the automobile after the usual front wheels and their supporting spindles have been removed. Slidably mounted on member 18 is a bracket 19 which may be clamped to the member by a plurality of bolts 20. The latter pass through suitable longitudinal slots 21 in member 18, and the two bolts at the left end of bracket 19 also extend through open-ended slots 22 (Fig. 6) in the side frame 15. Longitudinal movement of bracket 19, relatively to frame 15 and member 18, may be effected by turning a rod 23, which is rotatably mounted and held against axial movement in the lug on member 18 and has a threaded engagement with a lug on bracket 19.

In the outer face of member 18 is a vertically-disposed channel 24, which, as shown in Fig. 2, is closed by the rear face of bracket 19. A king-bolt $b$, which may be the usual one provided for holding the front axle spindle to the front axle, is passed vertically through the lugs $j$ and through the channel 24, and the depth of the latter is made substantially equal to the diameter of the king-bolt $b$ so that the latter effectually prevents lateral displacement of the member 18 and bracket 19 in either direction relatively to the front axle $a$. As to vertical displacement in either direction, this is prevented by the engagement of bracket 19 between the lugs $j$ of the front axle. It is particularly desired to permit a restricted longitudinal movement of frame 15 relatively to the front axle $a$ to allow for relative longitudinal movement between the front and rear axles. Accordingly, the width of channel 24 has been made greater than the diameter of king-bolt $b$ to permit an endwise sliding movement of the member 18 relatively to the axle.

The necessity for the provision of the sliding connection of the frame members 15 with the front axle $a$ and of the oscillating connection of the members with the rear axle housing will best appear from an inspection of Figs. 10 and 11. Thus, commonly, the front axle $a$ has rigidly attached thereto radius rods $t$, which are connected by a ball-and-socket joint to a part of the spring-supported frame of the automobile, as to the crank-case C, for example. Similarly, at the rear the drive-shaft tube T of the automobile is connected at one end by a universal joint to the crank-case C and at the other end is rigidly secured to the rear axle housing $h$. The tube T is usually braced by radius rods $u$. It will be obvious that, as frame A of the automobile moves up relatively to the front and rear axles, the rods $t$ and $u$ tend to pull the axles toward each other and, as the frame moves down, these rods tend to separate the axles. Likewise, as the frame A moves up and down, the tube T and rods $u$, which are rigidly connected to housing $h$, tend to turn the latter relatively to frames 15, causing an oscillation, which, although of slight degree, is nevertheless compensated for by the attaching means described. Although it is preferred to permit a slight oscillation of the housing $h$ relatively to the frame members 15, it is not absolutely essential so to do, for the degree of oscillation is so small that no serious difficulty will be encountered if the members 15 are rigidly held to the housing $h$.

The bracket 19, described, has fixed thereto an outwardly-projecting spindle 25 to revolubly support a wheel 26. Other similar wheels 27 are rotatably mounted, as shown in Fig. 9, on spindles 28 which are fixed in brackets 29 secured to the outer face of frame 15. The wheels 26 and 27 are merely idlers for the endless track to be described and may be of simple inexpensive construction. As shown, they may advantageously consist merely of two circular plates which are rigidly held together in spaced relation by bolts 30 and tubular separators 31. Attached substantially centrally on each frame 15 is a large wheel 32, hereinafter termed the main supporting wheel, and the two wheels are mounted on the ends of an intermediate axle 33 which is carried by the spaced frames 15 and extends transversely therebetween, as shown in Fig. 10. Wheels 32 have fixed thereto spaced annular ring plates 34, which are the equivalent of the circular plates of the wheels 26 and 27.

The wheels described are all idlers in the sense that none are constructed for propelling the endless track. The propelling means consist simply of sprocket-wheels 35 which are fixed to the outer ends of the two alined rear axles $r$ of automobile A (Fig. 14), after the usual driving wheels have been removed. In the event that the automobile with which the traction unit is used is of that type which employs live and dead rear axles, sprockets 35 would obviously be affixed to the live axles, for the sprockets constitute the means for connecting the endless traction track to the power plant of the automobile A. A brake drum $d$ (Fig. 14), similar to the usual brake drum on the rear driving wheel or it may advantageously be the identical drum removed from the driving wheel, if desired, is fixed to sprocket 35. If desired, the usual hub $i$ of the rear driving wheel may be removed from the wheel and advantageously used in conjunction with drum $d$ as a means of attaching sprocket 35 to the rear axle $r$, the sprocket being clamped between the flanges of hub $i$ by suitable bolts, as indicated, the bolts serving also to clamp drums $d$ to the sprockets.

The endless track may be of any desired type, but preferably is constructed as follows: A driving chain 36 is provided by utilizing alternate side plates 43 of an ordinary roller chain of suitable proportions, such side plates being connected into chain formation by the vertical legs of pairs of angle irons 39. This chain 36 is constructed for driving engagement with sprocket 35, and, as to wheels 26, 27, and 32, the chain passes loosely between the spaced side plates or flanges of the wheels and has only such limited lateral engagement with the flanges from time to time as is necessary for the lateral guiding of the chain. The latter is at all times held from engagement with the separators 31 or with the felly of wheel 32 by the track-forming units, as will later appear. The track-forming units comprise substantially rectangular slabs 37, which may have a facing 38 of rubber or any other desirable or suitable substance for the ground-engaging function. The width of slabs 37 is preferably slightly greater than, or at least equal to, the distance between the outer faces of the pairs of flanges on wheels 26, 27, and 32, as clearly shown in Fig. 8. Each slab 37 is secured to the horizontal legs of a pair of angle-irons 39 and such horizontal legs directly underlie the flanges of the described wheels, as clearly shown in Fig. 8. The upright leg of each angle-iron 39 is provided with two spaced holes to receive the pins 40 by means of which the angle-irons 39 are connected to the side plates 43 of the chain 36. The side plates 43 of the latter fit between the upright legs of the pairs of angle-irons 39, and the pins 40 are held from endwise movement by collars 41, as shown in Fig. 8, and the collars 41 are so arranged (in this instance by having their end faces flush with the end faces of the pins 40) as to directly receive and transmit to the side plates of the chain the lateral or side thrust imposed by the flanges of the idler wheels. By such arrangement, the pins 40 are protected from side thrust and consequent dislodgment. Each pin 40 carries the usual roll 42, and by alternately utilizing the usual side plates and angle-irons 39 the equivalent of a roller chain is provided.

It is to be particularly noted that the weight of the automobile is transmitted through the wheels 27 and 32 directly to the track-forming units and not through the members 39 or 43 of the track-propelling chain 36. As shown in Fig. 7, the flanges of the wheels, by engaging the track-forming units, position the chain 36 so that it cannot be engaged by the separators 31 or by the felly of wheel 32. Thus, the weight of the automobile is not transmitted through the rolls, pins, or usual side plates of the chain 36 with the possibility of shearing off the pins 40 or otherwise injuring the chain. Consequently, the chain 36, including the vertical legs of angle-irons 39, is merely subjected to tension, and ordinary roller chains of standard construction, being designed to resist tensional forces but not compressive or shearing forces, can be used to advantage with the simple track-forming units described to form an efficient endless traction track without resorting to special construction.

Referring now to Fig. 1, the chain 36 is applied to the sprocket 35 and to wheels 26, 27, and 32, as clearly shown, the sprocket 35 being the driver and wheel 26 an adjustable idler to tighten the chain, as desired. The wheels 27 and 32 are so arranged that chain 36 in its lower travel is guided in a curved path which bows out downwardly between the sprocket 35 and wheel 26 and has its maximum deflection adjacent the main supporting wheel 32. In travel over substantially flat roads, the weight of the vehicle is largely concentrated centrally on the wheels 32, although from time to time, according to road conditions, other wheels 27 come into play and even to some extent the forward wheel 26, if large obstructions are encountered. The arrangement of the wheels to guide the lower travel of chain 36 in a curved path permits the formation of pivotal areas in the endless track, upon which areas the automobile may be readily turned. This result is obtained without regard to which of the several wheels is subjected to the major portion of the weight of the vehicle, although normally the pivotal points in the endless track occur centrally and substantially in under wheel 32. The curved lower travel of the endless traction track is a feature of general utility in all tractors wherein the entire weight of the vehicle is imposed on an endless track, and accordingly, as to this feature, the invention is independent of the particular means for driving, supporting, and guiding the endless track.

The feature of the invention just described is important since it permits easy steering of the automobile, and the steering is preferably accomplished by varying the speed of one chain 36 relatively to the other. As an adjunct to the traction unit, means are provided to replace the usual steering gear connections, as the steering knuckles, connecting rod and drag link, and such means combine with two normally unrelated units of the existing automobile—the steering column and the rear axle brakes—to permit variation in the relative speeds of chains 36. And this is accomplished in such a manner that the usual steering wheel, when manipulated in the ordinary manner, will cause the automobile to turn in the same direction in which it would have been formerly turned by the usual steering gear. That is, if the operator formerly turned the wheel to the right to cause the car to swing to the right, a like movement of the steering wheel will cause a like movement of the car when the means to be described are used.

Referring to Figs. 10 and 12 to 14, inclusive, *s* represents the usual steering column, and *l* is the usual lever thereon which formerly connected with the usual drag link. A pin 45 is passed horizontally through lever *l* and projects from each side thereof, as shown in Fig. 13, for engagement with two links 46 arranged one on each side of lever $l$. The pin 45 engages in slots 47 in the links near one end thereof. At the other end, each link is pivotally connected, as shown in Fig. 10, to one arm of a bellcrank lever 48, which may be pivotally supported intermediate its ends from the adjacent frame 15. The other arms of the lever 48 are pivotally connected to brake-operating rods 49, which extend rearwardly along frames 15 for connection to the usual brake-operating levers. In Fig. 14, $m$ represents the usual internal brake-shoe, which may be expanded to engage the described drum $d$, and $n$ the usual lever which when swung forwardly or to the right, as viewed in Figs. 10 and 14, will expand shoe $m$. Referring now to Fig. 12, when lever $l$ is swung to the left, the right-hand link 46 will be moved to the left and its brake rod 49 drawn forwardly to apply the shoe $m$ to drum $d$. Similarly, the other brake-drum $d$ may be gripped, by movement of the left-hand link 46 to the right as lever $l$ swings to the right. However, the movement of one link 46 by lever $l$ does not move the other link, for the pin 45 rides idly in the slot 47 of the latter link. Thus, the brakes may be alternately applied to effect, in conjunction with the usual differential, the retardation of either of the two chains 36 and a turning of the automobile A in a manner now well known in the art. Considering Fig. 10 and assuming that the operator sits facing the left end of steering column $s$, if the latter is turned to the right or clockwise, the right-hand link 49 alone will be operated, and the right-hand chain 36 will be retarded to thereby swing the automobile on the pivotal areas of the track-forming units to the right, as is accomplished with the usual steering gear on a like movement of the steering column.

In operation, it will readily be apparent that the automobile may be driven over soils of yielding character, as well as on ordinary roads, and will readily ride over obstructions in a now well-known manner. It should also be noted that on hard soils but little of the endless track is engaged with the soil, while with soils of increasing yieldability increased areas of the endless track are automatically brought into play for the supporting function by the sinking of the track into the soil. That is to say, the degree of active supporting area of the endless track varies proportionately with the character of the substance with which it is engaged, being more for yielding than for non-yielding substances, whereby increased supporting area and tractive effort are automatically provided when needed.

It will be recognized that by providing the traction unit described, existing automobiles, ordinarily unfit for service on rough roads and yielding soils and incapable of riding over large obstructions, are rendered suitable for such fields of service. The invention provides a means for extending the fields of operation of already existing vehicles without substantial alterations therein but rather by the substitution of the units described for parts of the automobile. By the invention, it is not necessary to specially build a vehicle for the field of service desired nor is it necessary to rebuild existing vehicles. Rather, existing automobiles are made suitable for the desired class of service by a substitution of certain parts for other standard parts of the existing automobile without alteration of the latter. Thus, the front and rear wheels are removed, the front wheel spindles, steering knuckles, connecting rod, and drag link, together with the brake rods. The frame members 15 are then attached to the rear axle housing and attached to the forks of the front axle by using the usual king-bolt of the front wheel spindles. The sprocket 35 and its brake-drum $d$ are then substituted for the rear wheels, while the wheels 26 are already in place on frame 15, as a substitute for the front wheels, together with the wheels 27 and 32, which support the vehicle in place of the regular front and rear wheels. Thereafter, by connecting the links 46 to the steering column lever $l$ and the brake rods 49 to the usual brake-operating levers $n$, the conversion is complete and an operable, steerable tractor of the endless track type is obtained by the substitutions named from an existing automobile, with all the advantages of a specially built tractor of the type mentioned, but without the labor and expense of special construction.

Thus, I have provided a traction unit for converting already existing automobiles into tractors of the endless track type, as well as certain features which are generally useful in all tractors of the type described.

The invention has been disclosed herein for illustrative purposes, but the scope of the invention is defined by the appended claims rather than by the foregoing description.

What I claim is—

1. A traction unit, comprising, a rigid frame member constructed for attachment at one end of the rear transversely-disposed load-supporting member of an existing automobile and at the other end to the front axle of the automobile, an endless traction track and guiding devices therefor carried directly by said member, and means to connect said track with the power plant of the automobile to transmit power therefrom to propel said track.

2. A traction unit, comprising, a frame member for attachment at one end to the rear axle housing of an existing automobile and at the other end to the front axle of the automobile after the front wheels have been removed, an endless traction track and guiding devices therefor carried by said member, and means for connection with the rear axle of the automobile after the rear wheels have been removed to drive said track from the power plant of the automobile, said endless track extending from one end of said frame member to the other.

3. Means for converting existing automobiles into tractors of the endless traction track type, comprising, frame members, an endless traction track and guiding devices therefor carried by each frame member, each of the latter constructed and arranged for attachment at one end to the rear transversely-located load-supporting member of the automobile near one end of such member and for attachment at the other end to an end of the front axle of the automobile after its front wheels have been removed, and means for attachment to the driving axles of the automobile after its driving wheels have been removed to propel said tracks from the power plant of the automobile.

4. Means for converting existing automobiles into tractors of the endless traction track type, comprising, frame members, an endless traction track and guiding devices therefor carried by each member, said members constructed and arranged for attachment in spaced relation to the rear transversely-located load supporting member of the automobile near the ends of the latter member and for attachment in spaced relation to the front axle of the automobile after its front wheels and connections between the latter and the front axle have been removed, said frame members constructed and arranged for attachment to the front axle at the place formerly occupied by said connections, and means constructed and arranged to be substituted for the rear wheels of the automobile to propel said tracks from the power plant thereof.

5. Means for converting existing automobiles into tractors of the endless traction track type, comprising, frame members, an endless traction track and guiding devices therefor carried by each frame member, each of the latter constructed and arranged for attachment at one end to the rear transversely-located load-supporting member of the automobile near one end of such member and for attachment at the other end to an end of the front axle of the automobile after its front wheels have been removed, means for attachment to the driving axles of the automobile after its driving wheels have been removed to propel said tracks from the power plant of the automobile, and means adapted to be substituted for the steering connections and brake operating connections of the automobile to connect the steering wheel of the automobile to the brakes of the driving axle so that each brake may be applied independently of the other by the wheel to retard the speed of either of said tracks as desired to steer the automobile.

6. A tractor, comprising, a body, front and rear axles, springs supporting the body from the axles, radius rods connecting the axles to the body, spaced frame members extending longitudinally between the front and rear axles, endless self-laying tracks and guiding devices therefor carried by each frame member, means to drive said tracks, and means connecting each frame member to the front axle to permit restricted movements of the axles toward and away from one another.

7. Means for converting existing automobiles into tractors of the endless traction track type, comprising, frame members, an endless traction track and guiding devices therefor carried by each frame member, each of the latter constructed and arranged for attachment at one end to the rear transversely-located load-supporting member of the automobile near one end of such member, the other end of each frame member constructed to fit between the jaws of the forked end of the front axle of the automobile and to be held against vertical displacement thereby, means connecting each frame member to the front axle to permit restricted sliding movement between the front axle and frame member, and means to drive said tracks.

8. Means for converting existing automobiles into tractors of the endless traction track type, comprising, frame members, an endless traction track and guiding devices therefor carried by each frame member, each of the latter constructed and arranged for attachment at one end to the rear transversely-located load-supporting member of the automobile near one end of such member; the other end of each frame member constructed to fit between the jaws of the forked end of the front axle of the automobile and to be held against vertical displacement thereby, each frame member having a vertical slot, a king-bolt held to said jaws and passing through said slot, the latter and king-bolt being arranged to permit restricted longitudinal sliding of the frame on said jaws and to hold the frame from lateral displacement in the jaws, and means to drive said tracks.

9. Means for converting existing automobiles into tractors of the endless traction track type, comprising, frame members, an endless traction track and guiding devices therefor carried by each frame member, each of the latter constructed and arranged for attachment at one end to the rear transversely-located load-supporting member of the automobile near one end of such member, the other end of each frame member constructed to fit between the jaws of the forked end of the front axle of the automobile, and having in one face a vertical channel of substantially U-shaped cross-section, a bracket adjustably mounted on each frame, an idler wheel carried by each bracket and engageable with one of said tracks to regulate the tension thereof, said bracket being mounted on said face of its frame to close said channel, a king-bolt passing through said jaws and channel to hold the frame member against lateral displacement, and means to drive said tracks.

10. In a tractor, including the usual live rear axles and differential, a dead rear axle and a front axle, laterally spaced side frames connecting the front axle to the dead rear axle, an endless traction track and guiding devices therefor carried by each side frame, a track driving means fixed to each of the live rear axles, a brake drum on each of the latter, brake mechanism to coöperate with the drums, a steering wheel and rod, an arm carried by the rod, and means connecting said arm to each of said brake mechanisms, said last-named means including members one of which is operable only when said rod is turned in one direction and the other of which is operable only when said rod is turned in the other direction, whereby said brake mechanisms may be alternately operated to steer the tractor by turning the steering wheel in the usual manner.

11. Means for converting existing automobiles into tractors of the endless traction track type, comprising, frame members, an endless traction track and guiding devices therefor carried by each frame member, each of the latter constructed and arranged for attachment at one end to the rear transversely-located load-supporting member of the automobile near one end of such member, the other end of each frame member constructed to fit between the jaws of the forked end of the front axle of the automobile, and having in one face a vertical channel of substantially U-shaped cross-section, a bracket adjustably mounted on each frame, an idler wheel carried by each bracket and engageable with one of said tracks to regulate the tension thereof, said bracket being mounted on said face of its frame to close said channel, and a king-bolt passing through said jaws and channel to hold the frame member against lateral displacement and permit restricted longitudinal sliding of the frame on said jaws.

12. Means for converting existing automobiles into tractors of the endless traction track type, comprising, frame members, an endless traction track and guiding devices therefor carried by each frame member, each of the latter constructed and arranged for swiveled connection at one end to the rear transversely-located load-supporting member of the automobile near one end of such member and for attachment at the other end to an end of the front axle of the automobile after its front wheels have been removed, said frames and front axle being so connected as to permit relative longitudinal movement of the frames and axle, and means for attachment to the driving axles of the automobile after its driving wheels have been removed to propel said tracks from the power plant of the automobile.

13. A tractor, including, front and rear axles, a body, springs supporting the latter from said axles, radius rods for each axle pivotally connected to the body, spaced frame members extending longitudinally between said axles and so connected thereto as to permit restricted movements of the axles toward and away from each other as the body moves relatively thereto, an endless traction track and guiding devices therefor carried by each frame member, and means to drive said tracks.

14. Means for converting existing automobiles into tractors of the endless traction track type, comprising, frame members adapted to longitudinally connect laterally-spaced points of the front axle to laterally-spaced points on a non-rotatable part of the rear axle of the automobile after its wheels have been removed, an intermediate axle mounted near its ends in said frame members, a driving wheel adapted to be fixed to each of the drive shafts of the rear axle, a main supporting wheel on each end of said intermediate axle, an idler wheel carried by each frame adjacent the front axle, each set comprising a driving, supporting and idler wheel being arranged to rotate in the same plane, and a traction track carried by each set of wheels and arranged in its lower travel so that normally the major portion of the weight of the automobile is carried by said main supporting wheels and intermediate axle.

15. Means for converting existing automobiles into tractors of the endless traction track type, comprising, frame members, an endless traction track and guiding devices therefor carried by each frame member, each of the latter constructed and arranged for attachment at one end to an end of the front axle of the automobile after its front wheels have been removed and at the other end to a non-rotatable part of the rear axle of the automobile, said frame and part being so connected as to permit restricted oscillatory movements of said part relatively to the frame, and means to drive said tracks.

16. A tractor, including, front and rear axles, a body, springs supporting the latter from said axles, bracing means for each of the latter pivotally connected to the body, spaced side frames extending longitudinally of the tractor between the front and rear axles, an endless self-laying track and guiding devices therefor carried by each side frame, means to propel the track, and means connecting the side frames to said axles to permit such movements of the latter as occur from the movement of the body, springs and bracing means relatively to said frames.

CHARLES H. MARTIN.